US008769413B2

(12) United States Patent
Odero et al.

(10) Patent No.: US 8,769,413 B2
(45) Date of Patent: Jul. 1, 2014

(54) SYSTEM, METHOD AND COMPUTER PROGRAM PRODUCT FOR A MULTIFUNCTION TOOLBAR FOR INTERNET BROWSERS

(75) Inventors: Christine Odero, Santa Clara, CA (US); Umair A. Khan, Fremont, CA (US); Rizwan M. Tufail, Fremont, CA (US); Sergey Zabelin, Campbell, CA (US); Carina J. Han, Fremont, CA (US); Haixiao Yu, Union City, CA (US)

(73) Assignee: NVIDIA International, Inc., St. Michael (BB)

( * ) Notice: Subject to any disclaimer, the term of this patent is extended or adjusted under 35 U.S.C. 154(b) by 2595 days.

(21) Appl. No.: 09/932,262

(22) Filed: Aug. 17, 2001

(65) Prior Publication Data
US 2002/0070963 A1 Jun. 13, 2002

Related U.S. Application Data

(63) Continuation-in-part of application No. 09/405,533, filed on Sep. 24, 1999, now Pat. No. 6,427,175, and a continuation-in-part of application No. 09/406,009, filed on Sep. 24, 1999, now Pat. No. 6,460,038, and a continuation-in-part of application No. 09/876,671, filed on Jun. 7, 2001, now abandoned.

(60) Provisional application No. 60/209,873, filed on Jun. 7, 2000.

(51) Int. Cl.
G06F 3/00 (2006.01)
G06F 3/048 (2013.01)

(52) U.S. Cl.
CPC . *G06F 3/00* (2013.01); *G06F 3/048* (2013.01)
USPC ............ 715/739; 715/751; 715/763; 715/804

(58) Field of Classification Search
CPC .................................. G06F 3/00; G06F 3/048
USPC .................. 715/513, 517, 739, 751, 763, 804
See application file for complete search history.

(56) References Cited

U.S. PATENT DOCUMENTS

| 5,848,424 | A | * | 12/1998 | Scheinkman et al. ...... 715/501.1 |
| 6,072,486 | A | * | 6/2000 | Sheldon et al. ................ 715/835 |
| 6,427,175 | B1 | | 7/2002 | Khan et al. |
| 6,438,575 | B1 | | 8/2002 | Khan et al. |
| 6,453,339 | B1 | * | 9/2002 | Schultz et al. ................. 709/206 |
| 6,584,505 | B1 | * | 6/2003 | Howard et al. ................ 709/225 |
| 6,769,019 | B2 | * | 7/2004 | Ferguson ....................... 709/219 |
| 7,010,536 | B1 | * | 3/2006 | De Angelo ..................... 707/100 |
| 7,139,974 | B1 | * | 11/2006 | Bascom et al. ................ 715/513 |
| 2002/0018078 | A1 | | 2/2002 | Khan et al. |
| 2002/0029296 | A1 | * | 3/2002 | Anuff et al. .................... 709/311 |
| 2004/0165007 | A1 | * | 8/2004 | Shafron .......................... 345/781 |
| 2005/0114794 | A1 | * | 5/2005 | Grimes et al. ................. 715/840 |

* cited by examiner

*Primary Examiner* — Michael Roswell
(74) *Attorney, Agent, or Firm* — Zilka-Kotab, PC

(57) ABSTRACT

A system, method and article of manufacture provide a multifunction toolbar for a web browser. A toolbar is displayed over a web browser. The toolbar is linked to a portal of a user. The portal is for aggregating content selected by the user. A bucket is presented on the toolbar. The present invention recognizes when the user selects content on a website, which is displayed on the web browser, and drops the content in the bucket. The selected content is added to the portal.

47 Claims, 10 Drawing Sheets

SYSTEM, METHOD AND COMPUTER PROGRAM PRODUCT FOR A MULTIFUNCTION TOOLBAR FOR INTERNET BROWSERS

RELATED APPLICATIONS

This application is a continuation in part of U.S. Patent Application entitled Method and Apparatus for Collaborative Remote Link Management Using Group Sharable On-Line Bookmarks, filed on Sep. 24, 1999 now U.S. Pat. No. 6,427,175 under Ser. No. 09/405,533, U.S. Patent Application entitled System, Method and Article of Manufacture for Delivering Information to a User Through Programmable Network Bookmarks, filed on Sep. 24, 1999 now U.S. Pat. No. 6,460,038 under Ser. No. 09/406,009, and of U.S. Patent Application entitled System, Method, and Article of Manufacture for Generating a Customized Network User Interface, filed Jun. 7, 2001 now abandoned under Ser. No. 09/876,671, and which claims priority from Provisional U.S. Patent Application entitled System, Method, and Article of Manufacture for Generating a Customized Network User Interface, filed Jun. 7, 2000 under Ser. No. 60/209,873 and which are all incorporated herein by reference for all purposes.

FIELD OF THE INVENTION

The present invention relates to user interfaces and more particularly to a new toolbar for adding functionality to Internet browsers.

BACKGROUND OF THE INVENTION

Information on the Internet exists in the form of hyperlinks that appear in different HTML pages. A news site for example may contain headlines that are hyperlinks to their detailed exposition. Similarly, a company's intranet may contain multiple pages with several hyperlinks on each.

Custom Internet portals to display web-centric information exist (e.g., myYahoo, myLycos etc.). These portals aggregate information from different HTML sources into one interface where it can be accessed through one interface. However, the possible number of sources from which information is aggregated is fairly minimal. In typical portals, the user chooses from pre-selected information collected from a pre-determined set of information sources. The user has no control over either the sources he/she gets the content from or the information that is harvested from those web-sites. Further, the user has very little control over how the information is presented.

For example, if the user is interested in Indian politics, Soccer, and Semiconductor High Tech companies, myYahoo allows the user to configure Yahoo's news source to filter through news on these topics. However, the user must take all this content strictly from Yahoo-selected content providers. This arrangement prohibits users from choosing not just the type of content but the source of the content as well. While, for example, a user may want to be able to receive world politics news from his two favorite Indian news dailies every morning, get his Hi-Tech news coverage from Red Herring and CNET, and get sports news from Cricket.org and dailysoccer.com, access to all these sites through a prior art internet portal would be predicated on the Internet portal offering access to all of the particular site via that particular portal. This limitation forces the users to have access to only "popular" sources of information and effectively bars them from getting anything else.

What is needed is a method that allows the user to select and completely configure both the source and content that he/she wants on his/her own portal or habitat. Such customizable habitats and portals are described in copending U.S. Patent Application entitled SYSTEM, METHOD, AND ARTICLE OF MANUFACTURE FOR GENERATING A CUSTOMIZABLE NETWORK USER INTERFACE, filed Jun. 7, 2001, and copending U.S. Patent Application entitled SYSTEM, METHOD, AND ARTICLE OF MANUFACTURE FOR WIRELESS ENABLEMENT OF THE WORLD WIDE WEB USING A WIRELESS GATEWAY filed Jun. 16, 2000 under Ser. No. 09/595,781, each of which is assigned to common assignee Clickmarks, Inc., each of which is herein incorporated by reference for all purposes.

One method for adding content to the habitat or portal described in the documents above required the user to open the habitat or portal and select an "add content" menu item which brought up an ActiveX window. The URL (or other address) of the desired website (or other content source) is entered into a field in the ActiveX window. When the website pops up, information from it is dragged into the habitat.

The present invention improves on the method of adding content to the habitat or portal by allowing a user to select content for a portal or habitat while surfing the web in a way that does not interrupt the surfing experience.

SUMMARY OF THE INVENTION

A system, method and article of manufacture provide a multifunction toolbar for a web browser. The toolbar provides combined functionality in a heretofore unknown manner. Further, the toolbar allows a user to interact with a portal while surfing the web in a way that does not substantially interrupt the user's surfing experience. According to the present invention, a toolbar is displayed over a web browser. The toolbar can thus be integrated with an existing web browser, or can be a "floating" toolbar, much like another window. The toolbar does not need to be "always on top" of the toolbar, but can be made to be. The toolbar is linked to a portal of a user. The portal is for aggregating content (i.e., pointers to the content or the content itself) selected by the user for later output to the user. A bucket is presented on the toolbar. The bucket can be in the form of a button on the toolbar, for example. The present invention recognizes when the user selects content on a website, which is displayed on the web browser, and drops the content in the bucket. The user can do this by dragging and dropping the content onto the bucket. Note that "content" as used here can include any type of data, including video, audio, text, graphics, etc. The selected content is added to the portal. The content can be added to the portal via a link and/or can be stored on the system hosting the portal.

According to a preferred embodiment, a method for providing a multifunction toolbar for a web browser includes displaying a toolbar over a web browser. The toolbar includes a sign on button for allowing a user to sign on to a system. The toolbar links to a portal of a user upon the user signing in. Again, the portal is for aggregating content selected by the user. Additional features are presented on the toolbar upon the user signing in.

One such feature is a bucket. The present invention recognizes that the user has selected content on a website displayed on the web browser and dropped the content in the bucket. The selected content is added to the portal.

Another feature is a customize button. A customization screen is opened upon selection of the customize button. Features of the toolbar can be manipulated using the customization screen. A headlines button can be displayed on the toolbar. The headlines of the portal are displayed on the web browser upon selection of the headlines button. The toolbar can also include an email button. Email messages of the user are displayed upon selection of the email button. The email messages can be displayed on the browser, or an email program can be opened upon selection of the email link.

Another feature is a bookmark button. Bookmarks are displayed upon selection of the bookmark button. Bookmarks are links to pre-specified content. Preferably, the bookmarks are stored on a remote network site. The toolbar can also includes a synchronize bookmark button. The bookmarks are synchronized upon selection of the synchronize bookmark button. By synchronizing bookmarks, this means that changes to the bookmarks made by the user are synchronized with the bookmarks stored on the remote network site.

Yet another feature of the toolbar is a search field. Search results are displayed upon entry of a search term in the search field and selection of a "Search" button. The toolbar can also include a color button, which allows the user to change the color of the toolbar upon selection of the color button. Note that the features described with respect to the preferred embodiment can also be used with the first embodiment described.

BRIEF DESCRIPTION OF THE DRAWINGS

The invention will be better understood when consideration is given to the following detailed description thereof. Such description makes reference to the annexed drawings wherein:

FIG. 8 illustrates a toolbar displayed before a user logs in;

FIG. 9 illustrates a toolbar after user has been successfully logged in;

DETAILED DESCRIPTION OF THE PREFERRED EMBODIMENTS

Figure 1:
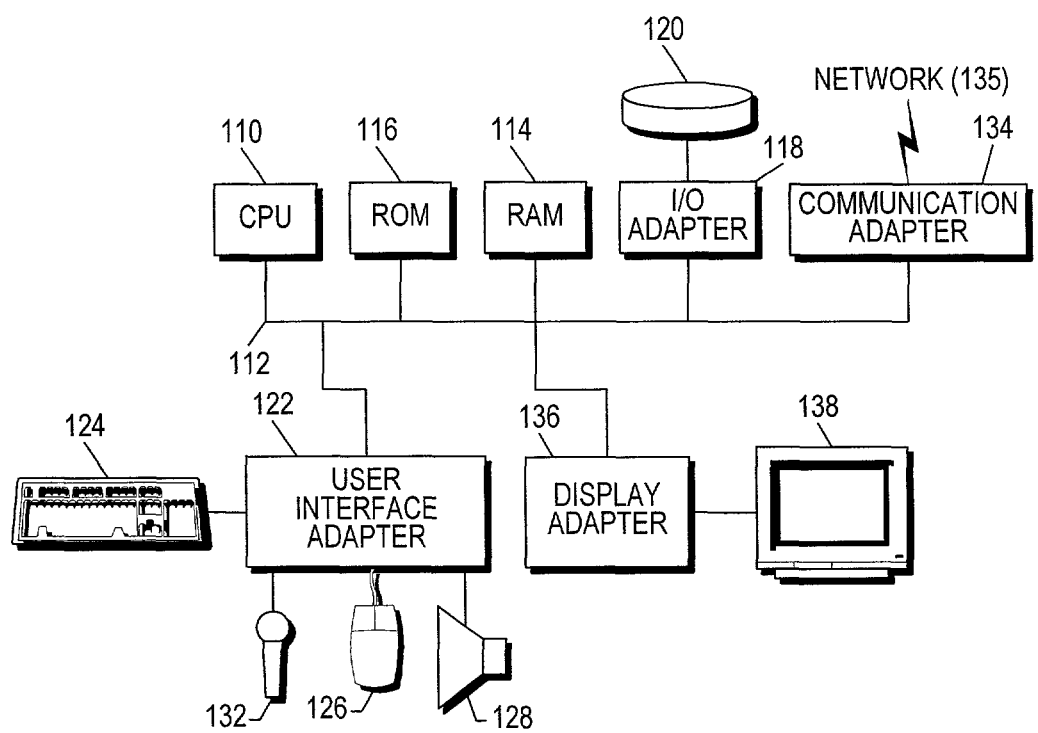
FIG. 1 is a schematic diagram of a hardware implementation of one embodiment of the present invention.

A preferred embodiment of a system in accordance with the present invention is preferably practiced in the context of a personal computer such as an IBM compatible personal computer, Apple Macintosh computer or UNIX based workstation. A representative hardware environment is depicted in FIG. 1, which illustrates a typical hardware configuration of a workstation in accordance with a preferred embodiment having a central processing unit 110, such as a microprocessor, and a number of other units interconnected via a system bus 112. The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network) and a display adapter 136 for connecting the bus 112 to a display device 138. The workstation typically has resident thereon an operating system such as the Microsoft Windows NT or Windows 2000 Operating System (OS), the IBM OS/2 operating system, the MAC OS, or UNIX operating system. Those skilled in the art will appreciate that the present invention may also be implemented on platforms and operating systems other than those mentioned.

The present invention allows a user to create an information portal whose information sources and content is completely customizable. Note that "portal" as used herein can also refer to a habitat. Information on the Internet exists in the form of hyperlinks that appear in different HTML pages. A news site for example may contain headlines that are hyperlinks to their detailed exposition. Similarly, a company's intranet may contain multiple pages with several hyperlinks on each. In typical portals, the user chooses from a pre-determined set of information collected from a pre-determined set of information sources. The user has no control over either the sources he/she gets the content from or the information that is harvested from those web-sites. Further, the user has very little control over how the information is presented.

Figure 2:
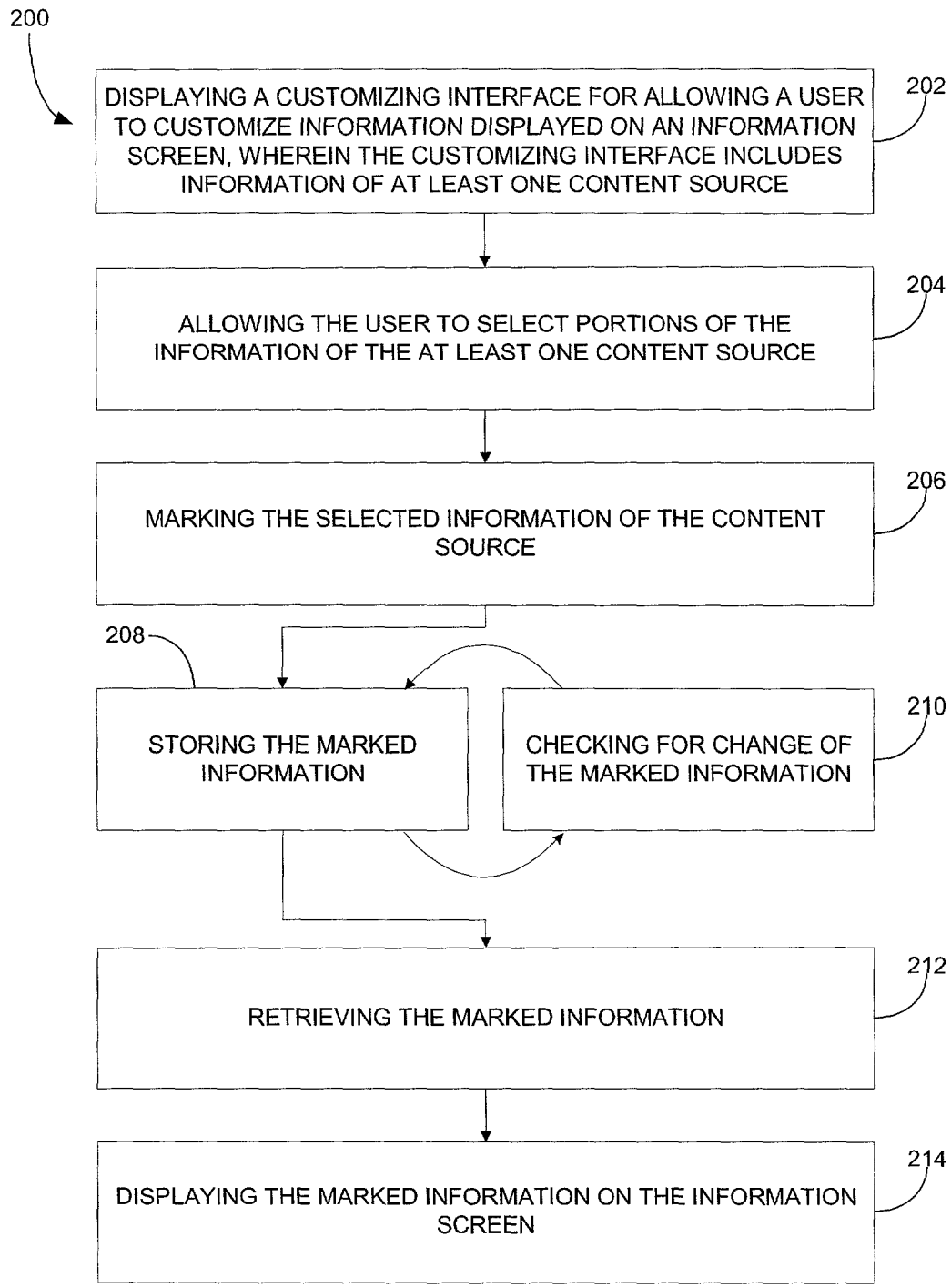
FIG. 2 illustrates a process for generating a customized network user interface according to one embodiment of the present invention.

FIG. 2 illustrates a process 200 for generating a customizable network user interface. A management interface is provided in operation 202. The management interface allows a user to select and manage information that is displayed on an information screen and viewed by the user. The management interface includes information of at least one content source which can be selected. It should be noted that such information can include such things as portions of web pages, links to web pages, images, active graphics, audio content or any other type of information. Such a content source can be a web page or any other content source. In operation 204, the user is further allowed to select portions of the information available in one or more of the content sources. The information selected from the content source may then be marked in operation 206. The information selected from the content source may then be marked through various means, such as for example highlighting, dragging-and-dropping, selecting from a menu, menu-based tagging (R+click), and/or an action through an input device, such as a mouse, touchpad, etc.

In operation 208, such marked information is stored for subsequent retrieval in operation 212. The marked information can be output to the user via the information screen. Over time, the information that has been marked on the remote content source may change. To allow current and updated information to be presented to the user via the information screen, a check is performed in operation 210 to determine whether any of the marked information has changed on the content source. Preferably, the check is performed periodically or upon occurrence of some event. The marked information is retrieved in operation 212. In operation 214, the marked information may then be retrieved manually or automatically from the content source and displayed on the information screen.

In one embodiment of the present invention, the information screen may include a plurality of different views pages or "views"Each view may contain at least one section or a "window" for displaying the marked information. Further, the user may be allowed to select, maximize, minimize, refresh and edit the content of the window.

In another embodiment of the present invention, the user may be allowed to share the views with other users such as via electronic mail or by permitting access to the views. As an option, the marked information may be presented on the information screen over a configurable number of days in the past. Further, the user may be allowed to "drag and drop" information of his/her choice from the customizing interface to the information screen. As mentioned above, desired information can also be added to the information screen through various means, such as for example highlighting, selecting from a menu, menu-based tagging (R+click), and/or an action through an input device, such as a mouse, touchpad, etc. The information may also be marked upon dropping the information in the information screen.

In still yet another embodiment, the step or act of marking the selected information may include determining an invariant descriptor of the selected information and/or of the tables, rows, columns, and/or cells comprising the selected information. The invariant descriptor may consist of a description of the location of the selected information within its source and of various distinguishing attributes of the sub-section(s) of the source that contain the selected information. Further, the step or act of checking for change of the marked information may include the steps or acts of determining whether the content of the marked information has changed and determining whether the format of the marked information has changed. As yet another option, the step or act of checking for change of the marked information may be performed at predetermined intervals.

Based upon the invariant descriptor, the selected information may be retrieved manually (i.e., by the user) or automatically and displayed in the appropriate views/windows of the customized information screen.

According to a preferred embodiment of the present invention, the user is presented with a page that contains the user's information of choice from an arbitrary number of different sources and presented in a completely customizable format. The page consists of different "views" where each view in turn contains multiple windows. The number of views and the number of windows in each view can be configured.

Each particular window contains hyperlinks that have been selected by the user from web-sites of his/her choice. A window may for instance be dedicated for international news and could contain hyperlinks selected by the user from any number of web-sites of his/her choice. The user has complete freedom in selecting the source of his/her content (i.e. the web-site) and the content from that source (i.e. the hyperlinks).

Figure 3:
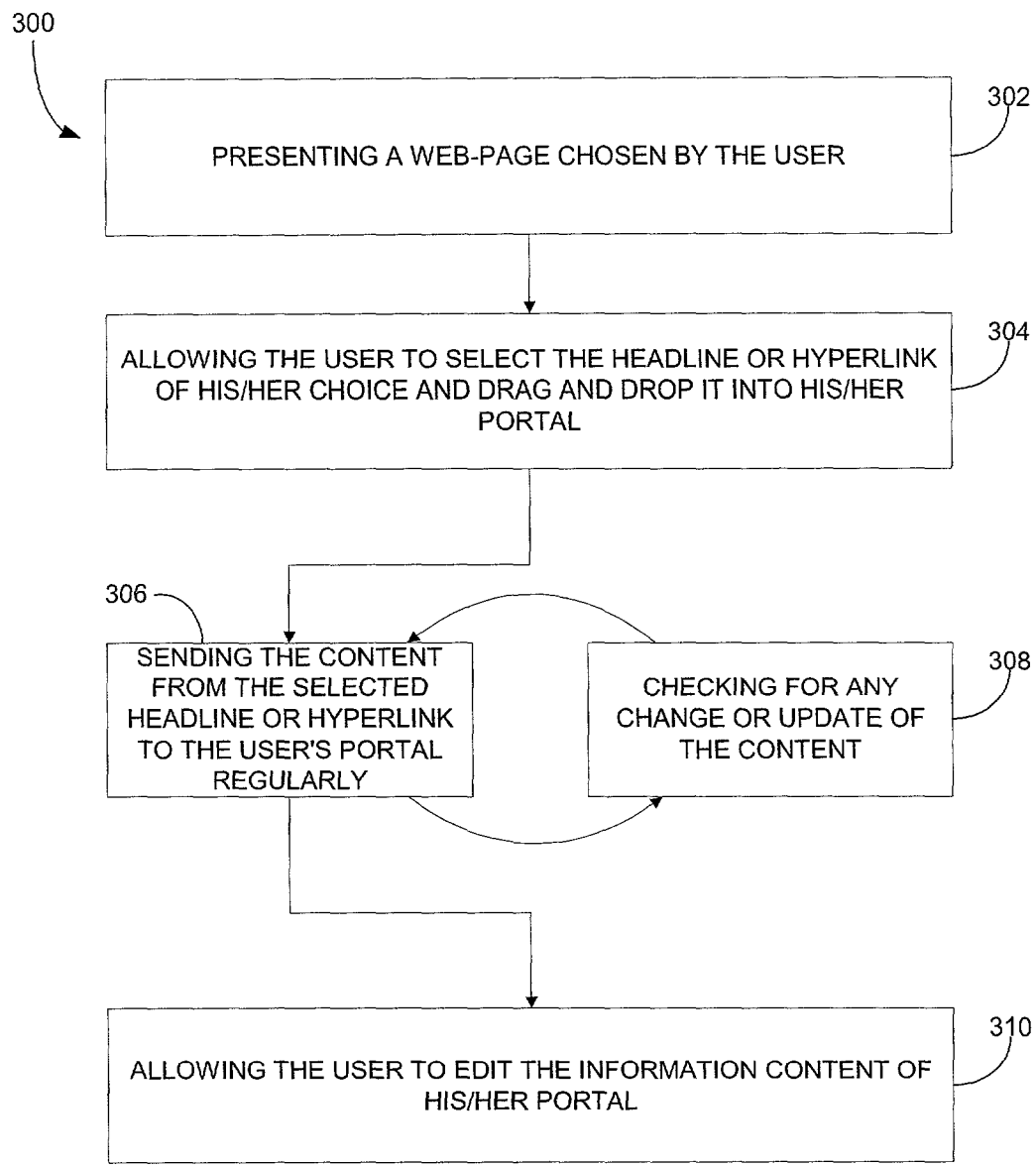
FIG. 3 is a flowchart of a process for allowing a user to customize an information portal according to one embodiment of the present invention.

FIG. 3 is a flowchart of a process 300 for allowing a user to customize an information portal according to one embodiment of the present invention. When the user wishes to add content, a web-page chosen by the user is presented in operation 302. In operation 304, the user is then allowed to select the headline or hyperlink of his/her choice and simply drags and drops it into his/her portal. From that point on, in operation 306, the content from that headline or hyperlink will be brought to the user's portal regularly. In operation 308, a check for any change or update of the content is made. If the content changes or is refreshed, the new content will be brought to the user. In operation 310, the user is further allowed to edit the content of his/her portal at will by adding or deleting headlines, moving them from one window to another within a view or moving them to other windows in different views.

Another embodiment of the present invention includes the following parts: (a) An interface that displays the user customized information, (b) an interface that allows the user to select and manage the information of choice, (c) a mechanism for marking selected information contained in a web-page (d) a method for communicating that information to the backend servers that process and store that information, (e) a mechanism for the storage of the selected information (f) a mechanism for regularly retrieving selected information and (g) a mechanism for checking for change in the content or the format of the selected sources of information.

The User Interface to Display Preferred Content.

The user interface comprises "views", each of which contain multiple windows. The number of windows in a view is completely configurable. The user may create or delete as many views as he/she may desire. This user interface allows a user to cleanly categorize related information within individual windows and views. This provides a user one place to access all of his/her favorite information and content from the web. This content includes (but is not limited to) (a) News and Information headlines (of all sorts) (b) Information about email, bank and other accounts (c) Information about shopping and comparison of rates and prices (d) Graphs, Images, Sounds or any other media.

This content is presented to the user with an ability to edit and manage it intuitively and interactively. Some of the features of the management process include (a) a presentation of the user's selected information over a configurable number of days in the past (b) an ability to select, maximize, minimize, refresh or edit the content of individual windows (c) to "publish" user's views into a directory of views and (d) to share these views with other people by emailing them the views.

The Interface for Selection and Management of Preferred Content.

The interface that allows the user to create his/her customized portal is based on an intuitive drag and drop capability. The user simply selects the sources or headlines of choice and drags and drops them into windows and views of choice. The drag and drop feature also makes customization very easy for the user, allowing quick compilation and management of their preferred content. There are two levels of selection and management provided, default and advanced.

Figure 4:
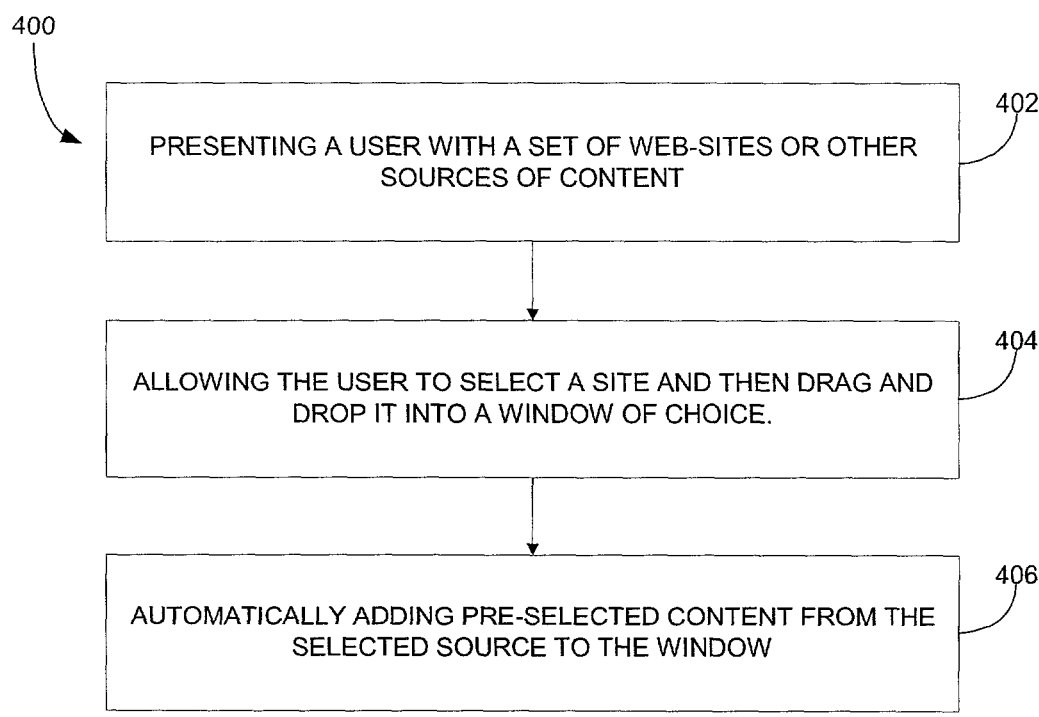
FIG. 4 depicts a default mode process for allowing selection and management of preferred content according to one embodiment of the present invention.

Referring to FIG. 4, in a default mode process 400 for allowing selection and management of preferred content according to one embodiment of the present invention, a user is presented with a set of web-sites or other sources of content in operation 402. In operation 404, the user is allowed to select a site and then drag and drop it into a window of choice. Once that is done, pre-selected content from that source is automatically added to the window in operation 406.

Figure 5:
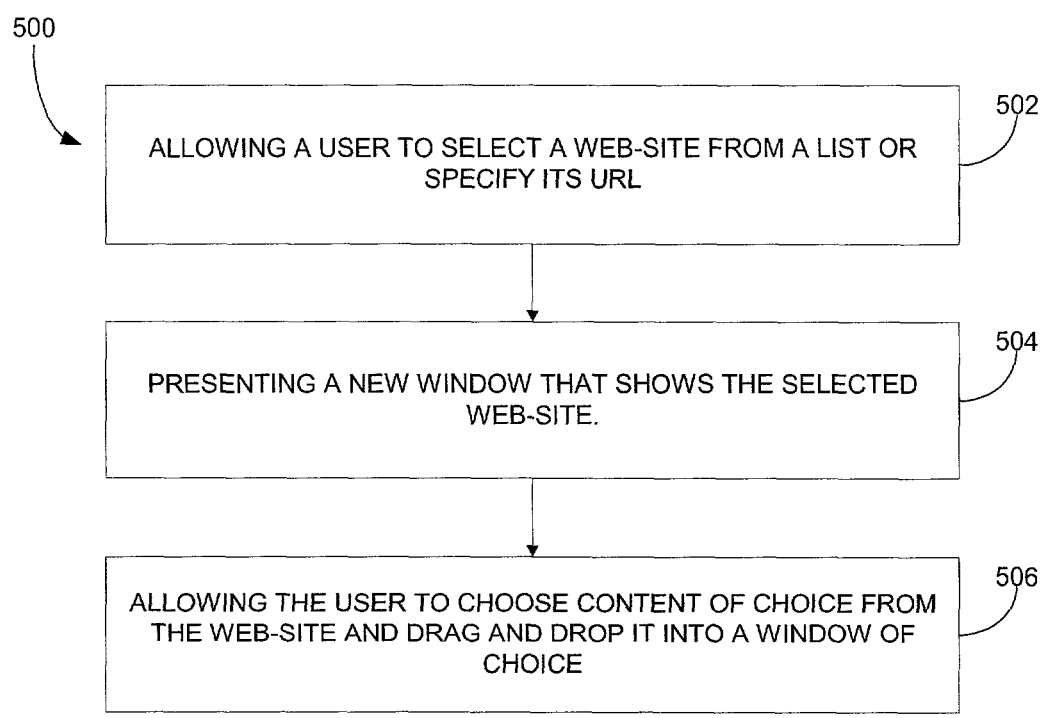
FIG. 5 is a flowchart of an advanced mode process for allowing selection and management of preferred content according to an embodiment of the present invention.

FIG. 5 is a flowchart of an advanced mode process 500 for allowing selection and management of preferred content according to an embodiment of the present invention. In operation 502, a user is allowed to select a web-site from a list or specify its URL. A new window is presented in operation 504 that shows the selected web-site. In operation 506, the user is allowed to choose content of choice from the web-site and drag and drop it into a window of choice.

The Mechanism for Tagging Selected Information Contained in a Web-Page.

Web-pages are created using HTML (Hyper Text Markup Language). The content in a web-page is formatted using a tabular format where each table is composed of individual cells distributed into a number of rows and columns. A table may contain other tables within its individual cells. The tagging of selected information within a web-page hinges upon assigning an address to each item of content within the web page. The addressing scheme takes into account the table(s), row(s), column(s) and cell(s) an item of content belongs to. An item of content can be identified by its address within a web-page and (ii) all the addressing schemes that take into account the table(s), row(s), column(s) and cell(s) an item of content belongs to. The addressing scheme works as follows:

The page is viewed to be composed of tables that may themselves contain other tables. The tables that are not contained in any other table (highest-level tables) are assigned identifying numbers starting from 1. Tables contained within the highest-level tables are assigned numbers that take into account the tables that contain them. If a table is not contained in any other table, then it may be assigned a number, say 3. If table number 3 contains two tables, then they will be assigned numbers 3-1 and 3-2 respectively. Each table is composed of a unique number of rows and columns. Each item of content resides within a cell that belongs to a specific row and column of a table. The complete address of an item of content is then the unique identifier of the table that contains it and the position of that item of content within that table.

In addition to the address, specific information about different items of content, the attributes of the items or of their locations within the source page may also be used. For example, HTML tables have properties in terms of their headers, numbers of columns, the fonts used in various parts, border widths etc. The attributes for tables are captured in exactly the same manner as the address indicated previously. Together, address and attribute information can be used to select and mark user requested information. For example, an invariant descriptor is generated by a combination of the address and the attributes. The invariant descriptor is then stored.

Figure 6:
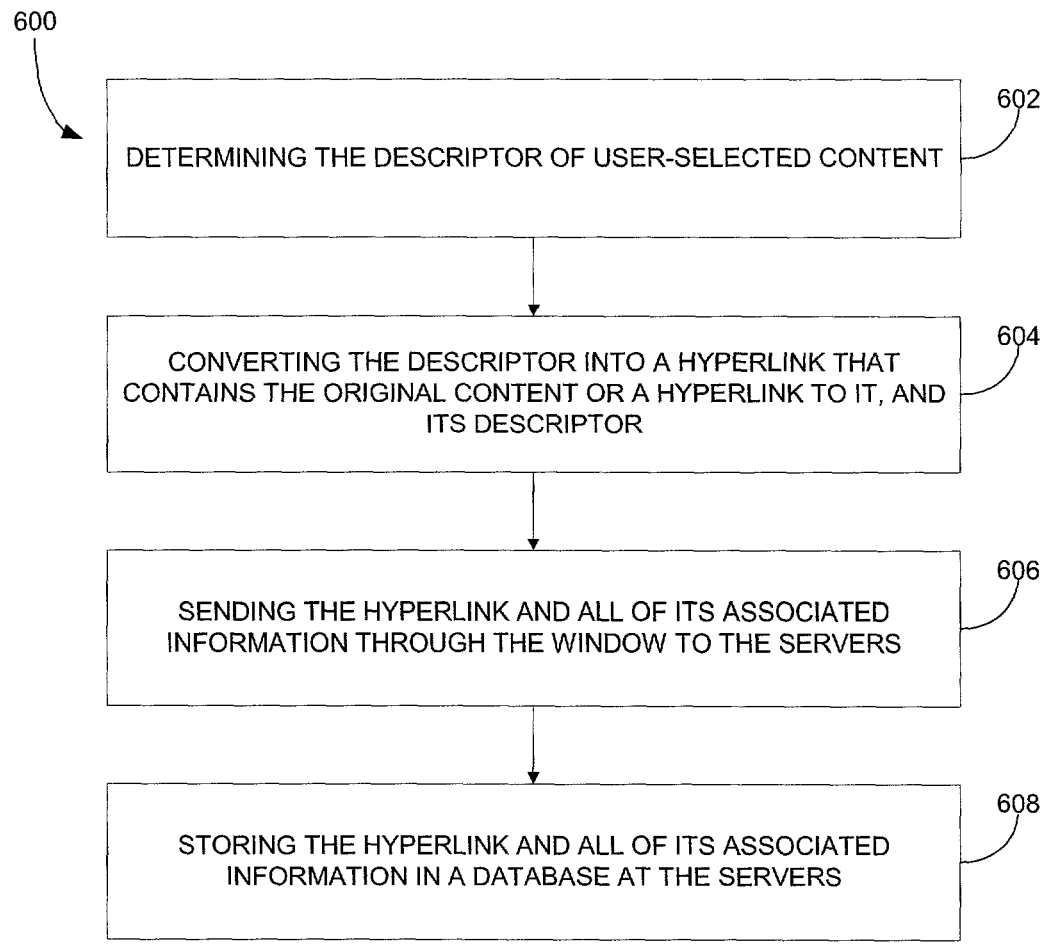
FIG. 6 is a flowchart depicting a process for tagging selected information contained in a web-page according to one embodiment of the present invention.

FIG. 6 is a flowchart depicting a process 600 for tagging selected information contained in a web-page. In operation 602, the invariant descriptor of user-selected content is determined, as set forth above. Once the invariant descriptor is determined, it is converted in operation 604 into a hyperlink that contains the original content or a hyperlink to it, and its invariant descriptor. When a user drags and drops that selected content into a window of choice, that hyperlink and all of its associated information is sent through the window to the servers in operation 606, where it is entered into a database in operation 608.

This mechanism also allows a capture of configurable sections of a web-page, including individual words, lines, paragraphs.

Figure 7:
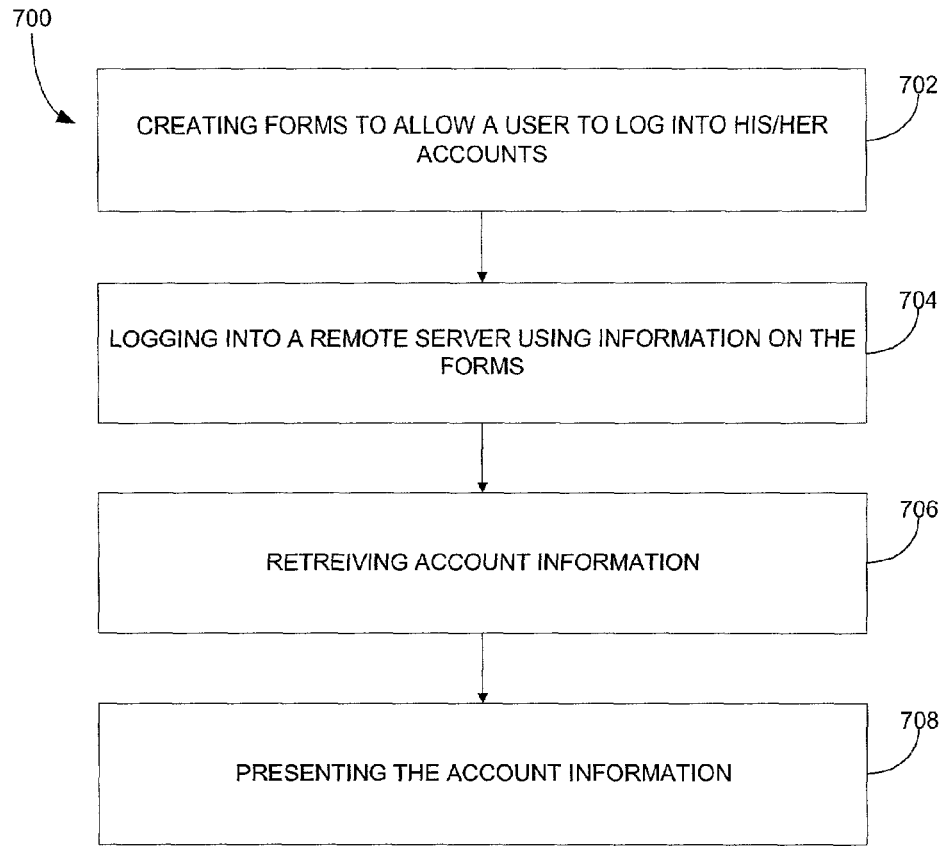
FIG. 7 is a flow diagram of a process for tagging secure information contained in a web-page.

In the case of secure information like email or bank accounts, the mechanism followed is shown in FIG. 7, which is a flow diagram of a process 700 for tagging secure information contained in a web-page. First, in operation 702, forms are created to allow a user to log into their accounts. These forms consist of (a) Dynamic information (like the user name and password) which is captured during the session (b) Static information that is required by the remote account server which is stored in a database and retrieved when an account is selected. Using the dynamic and static information, the server logs into the remote server in operation 704.

The account information is retrieved in operation 706 and, in operation 708, the account information is presented in a suitable and configurable format.

The Mechanism for Local Storage or Caching of Selected Content.

The selected information is cached or stored locally to enable a faster access. Once a web site is selected by a user, a copy of the site, including text and images, is kept locally in the servers. When any user requests a page that has been requested before, the cached copy is presented if the content of the site has not changed since the time the page was cached. The process is broken down into two: Simple and Customized addition of content:

Addition of Default content:

The addition of default content proceeds as follows:
1. Once a site is selected, the backend identifies the headlines that have been pre-selected for that site.
2. The server queries the database and picks up the default headlines.
3. The headlines that are not included in the pre-selected content are not included.
4. The server contacts the ActiveX control that constitutes the administrative page and communicates the selected headlines.
5. The selected headlines are visible in the ActiveX control and are also accessible to the main user interface.

Addition of Customized Content:

In the case of addition of customized content, the process is as follows:
1. The user selects a hyperlink by dragging and dropping them into the ActiveX control on the Administrative page.
2. The hyperlink and related information are sent to the servers. The information includes (a) the content of the link, (b) its location on the page, (c) the URL of the site, (d) the identity of the window and the view it has been dropped into and (e) the user name.
3. Once the link has been selected, it is added to the database and is accessible to the main user interface.

The Mechanism for Communication of Selected Information to the Backend Servers.

Once a hyperlink is dropped into a window, information is passed by the window to the backend servers. This information includes the address of the hyperlink, as defined above. In addition, the information about the window and the view containing that window is also sent to the server. This information is then used by scripts to generate the front page in HTML.

The Mechanism for Regular Retrieval of Preferred Content from Selected Sites.

The power of the current invention is that refreshed content is retrieved from the selected sources of information as they are updated. The sources of information, or web sites, selected by users are cached locally. The web pages stored locally are categorized according to the number of times they are requested. High request sites are retrieved once every few hours, for example.

The Mechanism to Check for a Change of Content or Format in the Selected Sources of Information.

Once a page has been requested by a user, it is retrieved on a regular basis. There are two checks performed to find out a change in the information in the page. The first involves a change in the content of the page and the second a change in the format in which the content is presented.

Change in a Page's Content:

Every time a page is retrieved, a copy is kept locally on servers. Once a page is automatically retrieved, the content from the newly retrieved version of the page is compared to the content from a previous version of the page. If there is a change in the content, then the updated content is retrieved.

A Change in the Format of the Content:

The formatting of the content in a page is stored in terms of a complete addressing scheme for the page, which specifies the breakdown of the page into its sub-sections. Once there is a change in the formatting of the page, then the relations of different subsections of the page to their parent sections change. A mechanism is implemented that keeps track of the number of differences between the format of a previously stored version of the page and the newly retrieved version. An alert is sent to the users if the number of differences is greater than a configurable number.

Toolbar

According to another embodiment of the present invention, a toolbar to be used with a web browser is provided that provides combined functionality in a heretofore unknown manner. Further, the toolbar allows a user to interact with a portal while surfing the web in a way that does not substantially interrupt the user's surfing experience.

Figure 8:
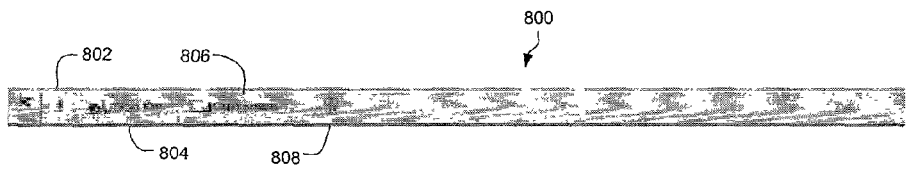

FIG. 8 illustrates the toolbar 800 before a user logs in, according to a preferred embodiment of the present invention. A portal button 802 takes a user to his or her portal upon selection. The portal button can also be programmed to link to another data site, such as the user's homepage or any other designated site. Selection of the sign on button 804 opens the sign on dialog for the user to enter a user name and password. Further, if the user has not registered with the portal, the sign on dialog can allow the user to sign up as a new user. Preferably, the user is directed to a portal registration page.

With continued reference to FIG. 8, the customize button 806 opens a pop-up menu which displays all the features of the toolbar upon selection of the customize button. Features of the toolbar can be manipulated using the menu, or customization screen, and the user can enable or disable any features he/she may prefer. The help button 808 provides access to help information, and may call help information to be displayed on the web browser.

Figure 9:
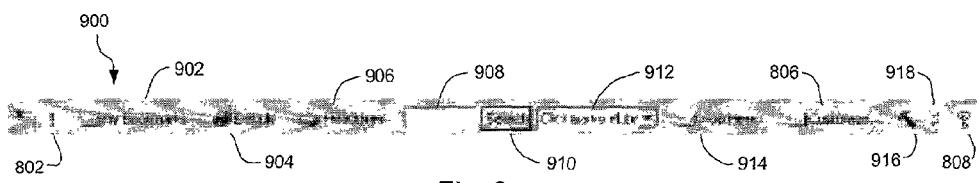

FIG. 9 illustrates the toolbar 900 after user has been successfully logged in, according to a preferred embodiment. The portal button is again displayed. The bookmark button 902 displays a user's bookmark information, such as by pop-up menu or window. Bookmarks are displayed upon selection of the bookmark button. Bookmarks are links to pre-specified content. Preferably, the bookmarks are stored on a remote network site. The toolbar can also includes a synchronize bookmark button. The bookmarks are synchronized upon selection of the synchronize bookmark button. By synchronizing bookmarks, this means that changes to the bookmarks made by the user are synchronized with the bookmarks stored on the remote network site. Bookmarking functions are described in more detail in co-pending US Patent Application entitled Method and Apparatus for Collaborative Remote Link Management Using Group Sharable On-Line Bookmarks, filed on Sep. 24, 1999 under Ser. No. 09/405,533, and co-pending US Patent Application entitled System, Method and Article of Manufacture for Delivering Information to a User Through Programmable Network Bookmarks, filed on Sep. 24, 1999 under Ser. No. 09/406,009, each of which is assigned to common assignee Clickmarks, Inc. and which are herein incorporated by reference.

The toolbar can also include an email button 904. Email messages of the user are displayed upon selection of the email button. The email messages can be displayed on the browser, by pop-up menu, or an email program can be opened upon selection of the email link. Preferably, a notification is presented when a user has email messages in general (read and unread), unread email messages, and/or upon recognition of arrival of an email message. In the latter case, a check for email can be performed at predetermined or configurable intervals.

A headlines button 906 can be displayed on the toolbar. Its selection opens a separate bar or window to display headlines preselected by the user, administrator, or by any person or mechanism. Preferably, selection of the headlines button opens a separate bar or window that displays a scrolling list of headlines selected by the user using the portal. The headlines can include links to portions of or the fall stories associated with the headlines. Selecting any of the headlines opens the contents of the associated story on the web browser, in another window, etc. The headlines of the portal can be displayed on the web browser or separate bar upon selection of the headlines button.

Yet another feature of the toolbar is a search field 908. Search results are displayed upon entry of a search term in the search field and selection of the search button 910. The search menu 912 allows a user to select a resource to search, such as other users' bookmarks or a search engine.

A bucket 914 is also provided on the toolbar, which enables a user to drag and drop any information they like during surfing. The user drags content on a website displayed on the web browser and drops it in the bucket. The selected content is automatically added to the portal, as described above in the description of the portal.

The toolbar also includes a color button 916, which allows the user to change the color of the toolbar upon selection of the color button. A color screen is displayed, which presents a plurality of colors from which the user can select. The user may also be allowed to enter a specified Red-Green-Blue (RGB) hex value if their choice is not in the selection palette.

Figure 10:
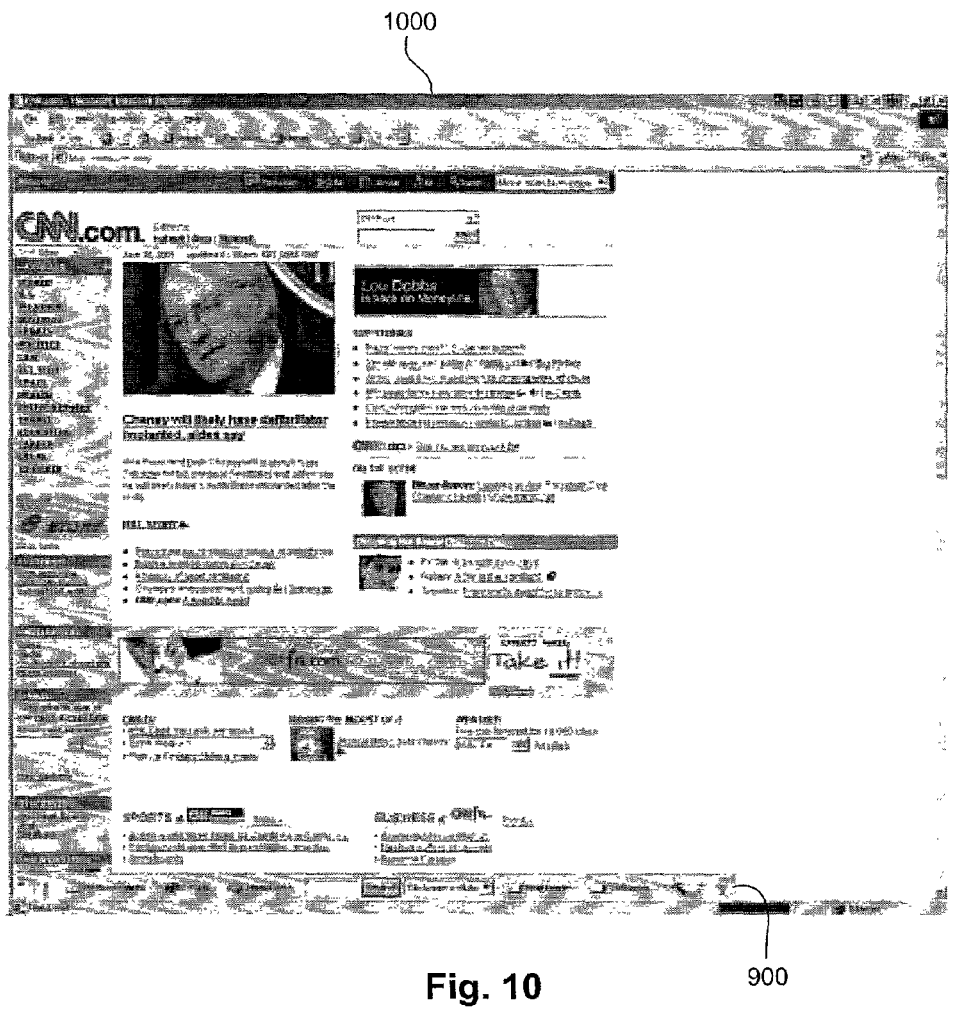
FIG. 10 illustrates the toolbar as can appear with respect to a web browser.

FIG. 10 illustrates the toolbar as can appear with respect to a web browser 1000. Note that the toolbar is preferably positioned at the bottom of the browser window, but can be positioned automatically, or at user direction, to any other portion of the browser window or display area of the user's viewing screen.

Figure 11:
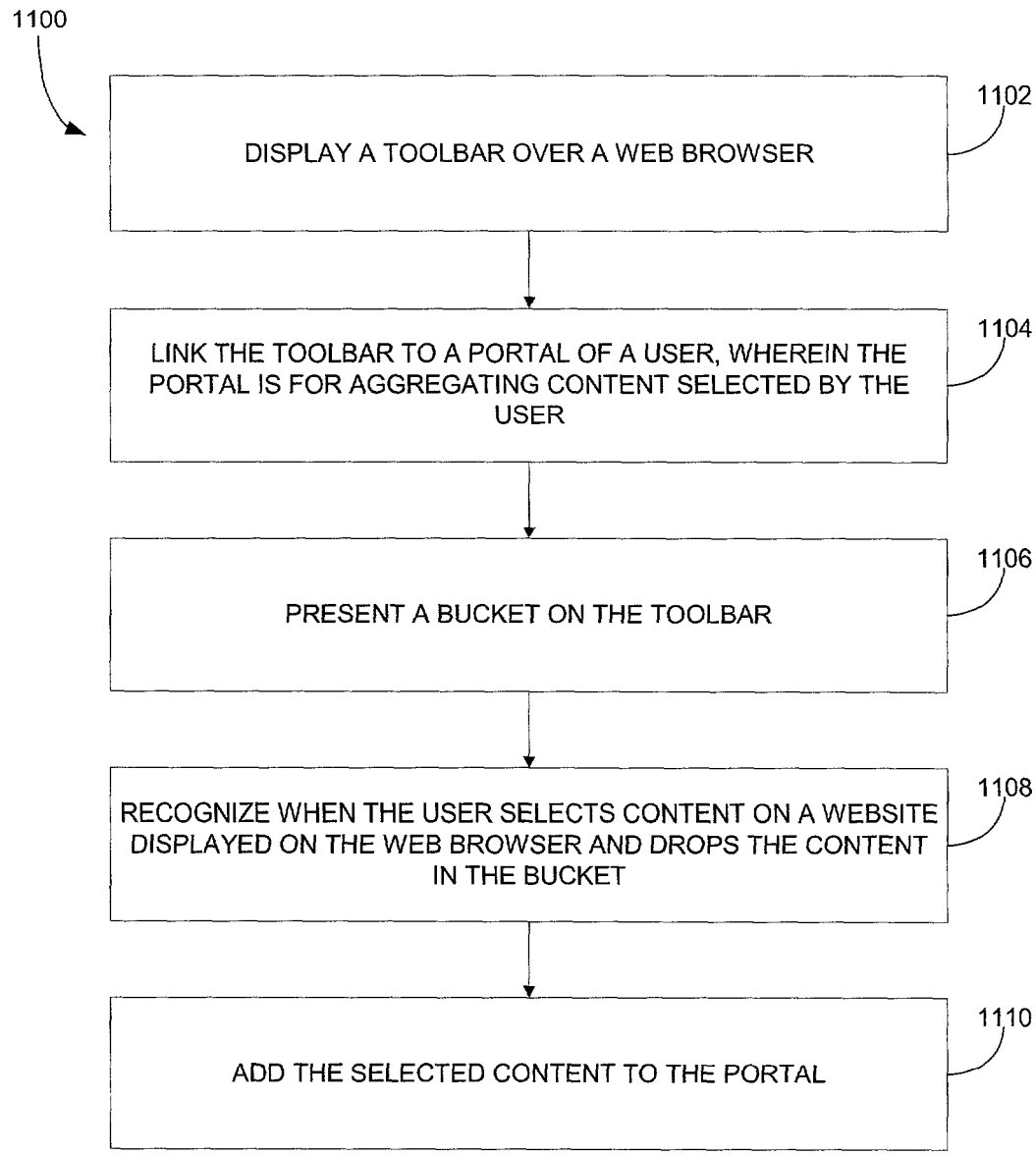
FIG. 11 is flow diagram depicting a process for providing a multifunction toolbar for a web browser according to one embodiment of the present invention.

FIG. 11 is flow diagram depicting a process 1100 for providing a multifunction toolbar for a web browser according to one embodiment of the present invention. In operation 1102, a toolbar is displayed over a web browser. The toolbar does not need to be "always on top" of the toolbar, but can be made to be. The toolbar is linked to a portal of a user in operation 1104. Portals are described above. A bucket is presented on the toolbar in operation 1106. The bucket can be in the form of a button on the toolbar, for example. In operation 1108, the present invention recognizes when the user selects content on a website, which is displayed on the web browser, and drops the content in the bucket. The user can do this by dragging and dropping the content onto the bucket. Note that "content" as used here can include any type of data, including video, audio, text, graphics, etc. The selected content is added to the portal in operation 1110. The content can be added to the portal via a link and/or can be stored on the system hosting the portal.

Figure 12:
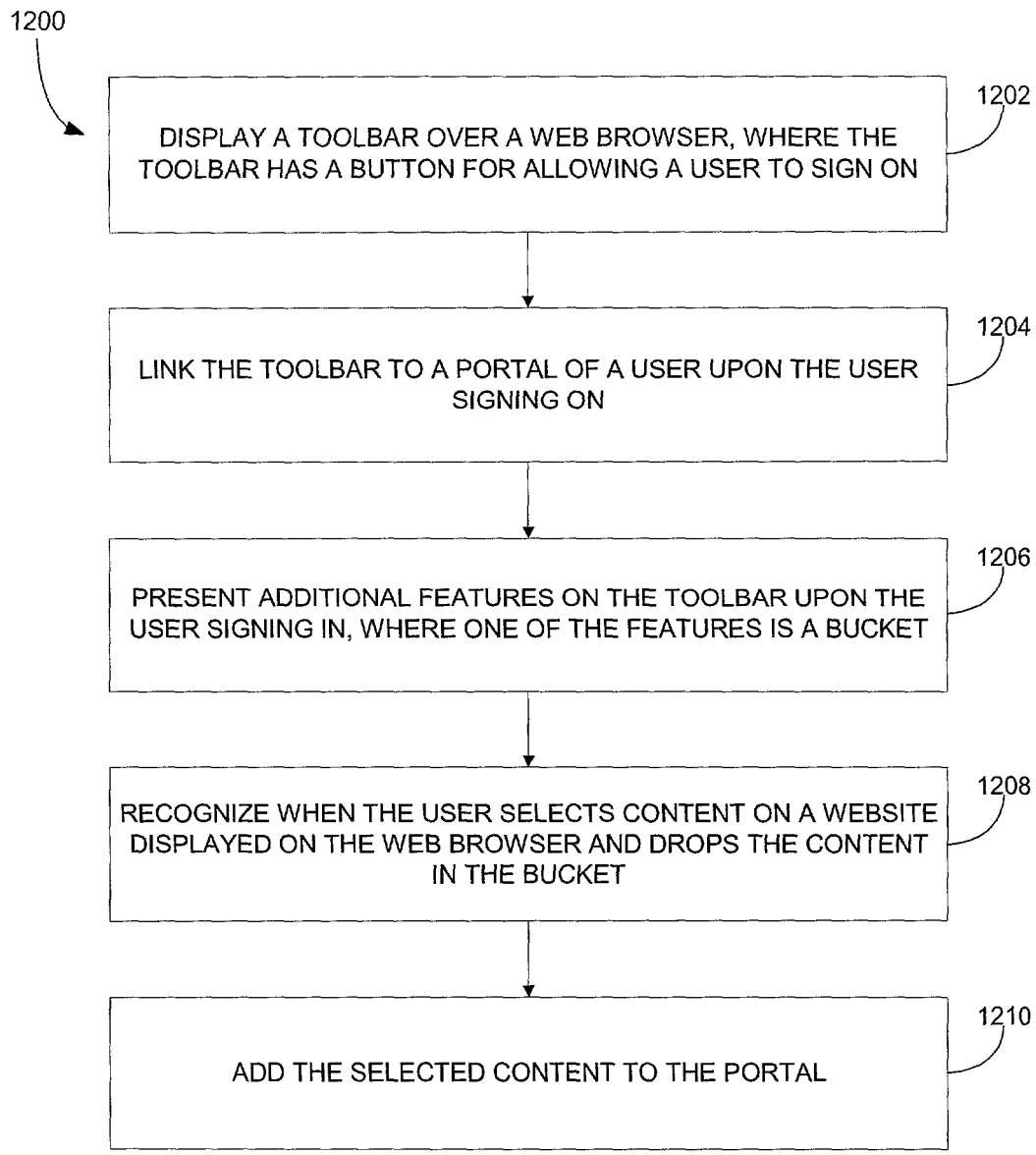
FIG. 12 is a flow diagram of a process for providing a multifunction toolbar for a web browser according to a preferred embodiment of the present invention.

FIG. 12 is a flow diagram of a process 1200 for providing a multifunction toolbar for a web browser according to a preferred embodiment of the present invention. In operation 1202, a toolbar is displayed over a web browser. The toolbar includes a sign on button for allowing a user to sign on to a system. In operation 1204, the toolbar links to a portal of a user upon the user signing in. Again, the portal is for aggregating content selected by the user. Additional features are presented on the toolbar in operation 1206 upon the user signing in. One such feature is a bucket. In operation 1208, the present invention recognizes when the user selects content on a website, which is displayed on the web browser, and drops the content in the bucket. The selected content is automatically added to the portal in operation 1210, as described above.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for providing a multifunction toolbar for a web browser, comprising:
   displaying a toolbar over a web browser on a computer;
   linking the toolbar to a portal of a user on a remote server coupled to the computer via a network, wherein the portal is for aggregating content selected by the user;
   presenting a bucket on the toolbar;
   recognizing when the user selects content on a webpage displayed on the web browser and drops the selected content in the bucket, wherein the content selected by the user is a portion of the webpage displayed on the web browser and includes one or more of individual words, individual lines, and individual paragraphs of the webpage; and
   in response to the user selecting the content and dropping the selected content in the bucket:
      determining an invariant descriptor of the selected content,
      converting the invariant descriptor of the selected content into a hyperlink for the selected content, and
      adding the selected content to the portal by sending information including the hyperlink for the selected content from the web browser on the computer to the remote server for storage on the remote server.

2. A method as recited in claim 1, wherein the toolbar includes a sign on button, wherein the toolbar links to the portal upon the user signing in.

3. A method as recited in claim 1, wherein the toolbar includes a customize button, wherein a customization screen is opened upon selection of the customize button, wherein features of the toolbar can be manipulated using the customization screen.

4. A method as recited in claim 1, wherein the toolbar includes a headlines button, wherein headlines of the portal are displayed on the web browser upon selection of the headlines button.

5. A method as recited in claim 1, wherein the toolbar includes an email button, wherein email messages of the user are displayed upon selection of the email button.

6. A method as recited in claim 1, wherein the toolbar includes a bookmark button, wherein bookmarks are displayed upon selection of the bookmark button.

7. A method as recited in claim 6, wherein the toolbar includes a synchronize bookmark button, wherein the bookmarks are synchronized upon selection of the synchronize bookmark button.

8. A method as recited in claim 1, wherein the toolbar includes a search field, wherein search results are displayed upon entry of a search term in the search field.

9. A method as recited in claim 1, wherein the toolbar includes a color button, wherein the user is allowed to change a color of the toolbar upon selection of the color button.

10. The method as recited in claim 1, wherein the bucket includes a button on the toolbar.

11. The method as recited in claim 1, wherein the content further includes at least one of video, audio, and graphics.

12. The method as recited in claim 1, wherein the information further includes a location of the selected content on the webpage, an identity of a window, a view that the selected content has been dropped into, and a user name of the user.

13. The method as recited in claim 1, wherein the content added to the portal is updated on the remote server according to a number of times the content is requested by the user.

14. The method as recited in claim 1, wherein the content added to the portal is categorized according to a number of times the content is requested by the user.

15. The method as recited in claim 1, wherein a check is performed by the remote server to determine if the content stored on the remote server has changed on a source of the content.

16. The method as recited in claim 15, wherein in response to a determination that the content stored on the remote server has changed on the source of the content, the remote server updates the content stored on the remote server by retrieving the changed content from the source of the content.

17. The method as recited in claim 1, wherein the invariant descriptor comprises a description of a location of the selected content within the webpage, and at least one distinguishing attribute of a sub-section of the webpage that contains the selected content.

18. The method as recited in claim 1, wherein the invariant descriptor is generated using a combination of an address of the webpage containing the selected content, and at least one distinguishing attribute of a sub-section of the webpage that contains the selected content.

19. A non-transitory computer-readable storage medium storing instructions that, when executed by a processor, cause the processor to perform steps, comprising:
   displaying a toolbar over a web browser on a computer;
   linking the toolbar to a portal of a user on a remote server coupled to the computer via a network, wherein the portal is for aggregating content selected by the user;
   presenting a bucket on the toolbar;
   recognizing when the user selects content on a webpage displayed on the web browser and drops the selected content in the bucket, wherein the content selected by the user is a portion of the webpage displayed on the web browser and includes one or more of individual words, individual lines, and individual paragraphs of the webpage; and
   in response to the user selecting the content and dropping the selected content in the bucket:
      determining an invariant descriptor of the selected content,
      converting the invariant descriptor of the selected content into a hyperlink for the selected content, and
      adding the selected content to the portal by sending information including the hyperlink for the selected content from the web browser on the computer to the remote server for storage on the remote server.

20. A non-transitory computer-readable storage medium as recited in claim 19, wherein the toolbar includes a sign on button, wherein the toolbar links to the portal upon the user signing in.

21. A non-transitory computer-readable storage medium as recited in claim 19, wherein the toolbar includes a customize button, wherein a customization screen is opened upon selection of the customize button, wherein features of the toolbar can be manipulated using the customization screen.

22. A non-transitory computer-readable storage medium as recited in claim 19, wherein the toolbar includes a headlines button, wherein headlines of the portal are displayed on the web browser upon selection of the headlines button.

23. A non-transitory computer-readable storage medium as recited in claim 19, wherein the toolbar includes an email button, wherein email messages of the user are displayed upon selection of the email button.

24. A non-transitory computer-readable storage medium as recited in claim 19, wherein the toolbar includes a bookmark button, wherein bookmarks are displayed upon selection of the bookmark button.

25. A non-transitory computer-readable storage medium as recited in claim 24, wherein the toolbar includes a synchronize bookmark button, wherein the bookmarks are synchronized upon selection of the synchronize bookmark button.

26. A non-transitory computer-readable storage medium as recited in claim 19, wherein the toolbar includes a search field, wherein search results are displayed upon entry of a search term in the search field.

27. A non-transitory computer-readable storage medium as recited in claim 19, wherein the toolbar includes a color button, wherein the user is allowed to change a color of the toolbar upon selection of the color button.

28. A system, comprising:
a memory storing a representation of a toolbar; and
a processor coupled to the memory and configured to:
display the toolbar over a web browser on a computer;
link the toolbar to a portal of a user on a remote server coupled to the computer via a network, wherein the portal is for aggregating content selected by the user;
present a bucket on the toolbar;
recognize when the user selects content on a webpage displayed on the web browser and dropping the selected content in the bucket, wherein the content selected by the user is a portion of the webpage displayed on the web browser and includes one or more of individual words, individual lines, and individual paragraphs of the webpage; and
in response to the user selecting the content and dropping the selected content in the bucket, the processor:
determines an invariant descriptor of the selected content,
converts the invariant descriptor of the selected content into a hyperlink for the selected content, and
adds the selected content to the portal by sending information including the hyperlink for the selected content from the web browser on the computer to the remote server for storage on the remote server.

29. A method for providing a multifunction toolbar for a web browser, comprising:
displaying a toolbar over a web browser on a computer;
wherein the toolbar includes a sign on button for allowing a user to sign on to a system;
linking the toolbar to a portal of the user on a remote server coupled to the computer via a network upon the user signing on, wherein the portal is for aggregating content selected by the user;
presenting additional features on the toolbar upon the user signing in;
wherein one of the additional features is a bucket presented on the toolbar;
recognizing when the user selects content on a webpage displayed on the web browser and drops the selected content in the bucket, wherein the content selected by the user is a portion of the webpage displayed on the web browser and includes one or more of individual words, individual lines, and individual paragraphs of the webpage; and
in response to the user selecting the content and dropping the selected content in the bucket:
determining an invariant descriptor of the selected content,
converting the invariant descriptor of the selected content into a hyperlink for the selected content, and
adding the selected content to the portal by sending information including the hyperlink for the selected content from the web browser on the computer to the remote server for storage on the remote server.

30. A method as recited in claim 29, wherein the toolbar includes a customize button, wherein a customization screen is opened upon selection of the customize button, wherein features of the toolbar can be manipulated using the customization screen.

31. A method as recited in claim 29, wherein the toolbar includes a headlines button, wherein headlines of the portal are displayed on the web browser upon selection of the headlines button.

32. A method as recited in claim 29, wherein the toolbar includes an email button, wherein email messages of the user are displayed upon selection of the email button.

33. A method as recited in claim 29, wherein the toolbar includes a bookmark button, wherein bookmarks are displayed upon selection of the bookmark button.

34. A method as recited in claim 33, wherein the toolbar includes a synchronize bookmark button, wherein the bookmarks are synchronized upon selection of the synchronize bookmark button.

35. A method as recited in claim 29, wherein the toolbar includes a search field, wherein search results are displayed upon entry of a search term in the search field.

36. A method as recited in claim 29, wherein the toolbar includes a color button, wherein the user is allowed to change a color of the toolbar upon selection of the color button.

37. A non-transitory computer-readable storage medium storing instructions that, when executed by a processor, cause the processor to perform steps, comprising:
computer code for displaying a toolbar over a web browser on a computer, wherein the toolbar includes a sign on button for allowing a user to sign on to a system;
computer code for linking the toolbar to a portal of the user on a remote server coupled to the computer via a network upon the user signing in, wherein the portal is for aggregating content selected by the user;
computer code for presenting additional features on the toolbar upon the user signing in, wherein one of the additional features is a bucket presented on the toolbar;
computer code for recognizing when the user selects content on a webpage displayed on the web browser and drops the selected content in the bucket, wherein the content selected by the user is a portion of the webpage displayed on the web browser and includes one or more of individual words, individual lines, and individual paragraphs of the webpage; and
computer code for, in response to the user selecting the content and dropping the selected content in the bucket:
determining an invariant descriptor of the selected content,
converting the invariant descriptor of the selected content into a hyperlink for the selected content, and
adding the selected content to the portal by sending information including the hyperlink for the selected content from the web browser on the computer to the remote server for storage on the remote server.

38. A non-transitory computer-readable storage medium as recited in claim 37, wherein the toolbar includes a customize button, wherein a customization screen is opened upon selection of the customize button, wherein features of the toolbar can be manipulated using the customization screen.

39. A non-transitory computer-readable storage medium as recited in claim 37, wherein the toolbar includes a headlines button, wherein headlines of the portal are displayed on the web browser upon selection of the headlines button.

40. A non-transitory computer-readable storage medium as recited in claim 37, wherein the toolbar includes an email button, wherein email messages of the user are displayed upon selection of the email button.

41. A non-transitory computer-readable storage medium as recited in claim 37, wherein the toolbar includes a bookmark button, wherein bookmarks are displayed upon selection of the bookmark button.

42. A non-transitory computer-readable storage medium as recited in claim 41, wherein the toolbar includes a synchronize bookmark button, wherein the bookmarks are synchronized upon selection of the synchronize bookmark button.

43. A non-transitory computer-readable storage medium as recited in claim 37, wherein the toolbar includes a search field, wherein search results are displayed upon entry of a search term in the search field.

44. A non-transitory computer-readable storage medium as recited in claim 37, wherein the toolbar includes a color button, wherein the user is allowed to change a color of the toolbar upon selection of the color button.

45. A system, comprising:
a memory storing a representation of a toolbar; and
a processor coupled to the memory and configured to:
display the toolbar over a web browser on a computer, wherein the toolbar includes a sign on button for allowing a user to sign on to a system;
link the toolbar to a portal of the user on a remote server coupled to the computer via a network upon the user signing in, wherein the portal is for aggregating content selected by the user;
present additional features on the toolbar upon the user signing in, wherein one of the additional features is a bucket presented on the toolbar;
recognize when the user selects content on a webpage displayed on the web browser and drops the selected content in the bucket, wherein the content selected by the user is a portion of the webpage displayed on the web browser and includes one or more of individual words, individual lines, and individual paragraphs of the webpage; and
in response to the user selecting the content and dropping the selected content in the bucket, the processor:
determines an invariant descriptor of the selected content,
converts the invariant descriptor of the selected content into a hyperlink for the selected content, and
adds the selected content to the portal by sending information including the hyperlink for the selected content from the web browser on the computer to the remote server for storage on the remote server.

46. A method for providing a multifunction toolbar for a web browser, comprising:
displaying a toolbar over a web browser on a computer;
wherein the toolbar includes a sign on button for allowing a user to sign on to a system;
linking the toolbar to a portal of the user on a remote server coupled to the computer via a network upon the user signing in, wherein the portal is for aggregating content selected by the user;
presenting additional features on the toolbar upon the user signing in;
wherein the toolbar includes a bucket;
recognizing when the user selects content on a webpage displayed on the web browser and drops the selected content in the bucket, wherein the content selected by the user is a portion of the webpage displayed on the web browser and includes one or more of individual words, individual lines, and individual paragraphs of the webpage; and
in response to the user selecting the content and dropping the selected content in the bucket:
determining an invariant descriptor of the selected content,
converting the invariant descriptor of the selected content into a hyperlink for the selected content, and
adding the selected content to the portal by sending information including the hyperlink for the selected content from the web browser on the computer to the remote server for storage on the remote server;
wherein the toolbar includes a customize button, wherein a customization screen is opened upon selection of the customize button, wherein features of the toolbar can be manipulated using the customization screen;
wherein the toolbar includes a headlines button, wherein headlines of the portal are displayed on the web browser upon selection of the headlines button;
wherein the toolbar includes an email button, wherein email messages of the user are displayed upon selection of the email button;
wherein the toolbar includes a bookmark button, wherein bookmarks are displayed upon selection of the bookmark button;
wherein the toolbar includes a synchronize bookmark button, wherein the bookmarks are synchronized upon selection of the synchronize bookmark button;
wherein the toolbar includes a search field, wherein search results are displayed upon entry of a search term in the search field;
wherein the toolbar includes a color button, wherein the user is allowed to change a color of the toolbar upon selection of the color button.

47. A method, comprising:
displaying a toolbar in association with a web browser on a computer, the toolbar including a sign on button for allowing a user to sign on to a system;
linking the toolbar to a portal of the user on a remote server coupled to the computer via a network upon the user signing on, the portal being for aggregating content selected by the user;
providing additional features on the toolbar upon the user signing in, one of the additional features being in association with an icon presented on the toolbar;
recognizing when the user selects, in association with the icon, content of a webpage displayed on the web browser, wherein the content selected by the user is a portion of the webpage displayed on the web browser and includes one or more of individual words, individual lines, and individual paragraphs of the webpage;
determining an invariant descriptor of the selected content;
converting the invariant descriptor of the selected content into a hyperlink for the selected content; and
adding the selected content to the portal by sending information including the hyperlink for the selected content from the web browser on the computer to the remote server for storage on the remote server.

\* \* \* \* \*